US010228065B2

(12) United States Patent
Gaburri et al.

(10) Patent No.: US 10,228,065 B2
(45) Date of Patent: Mar. 12, 2019

(54) FLEXIBLE SEAT BALL VALVE

(71) Applicant: Cameron International Corporation, Houston, TX (US)

(72) Inventors: Edy Gaburri, Piateda (IT); Augusto Arcelaschi, Colico (IT)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/249,335

(22) Filed: Aug. 26, 2016

(65) Prior Publication Data

US 2018/0038491 A1    Feb. 8, 2018

(30) Foreign Application Priority Data

Aug. 2, 2016 (EP) .................................... 16275109

(51) Int. Cl.
| | | |
|---|---|---|
| *F16K 5/06* | (2006.01) | |
| *F16K 5/20* | (2006.01) | |
| *F16K 25/00* | (2006.01) | |
| *F16K 27/06* | (2006.01) | |

(52) U.S. Cl.
CPC .......... *F16K 5/0673* (2013.01); *F16K 5/0689* (2013.01); *F16K 5/201* (2013.01); *F16K 5/205* (2013.01); *F16K 5/207* (2013.01); *F16K 25/005* (2013.01); *F16K 27/067* (2013.01)

(58) Field of Classification Search
CPC ...... F16K 5/0673; F16K 5/0689; F16K 5/201; F16K 5/0678; F16K 25/005; F16K 27/067
USPC ....................... 251/315.03, 315.01, 314, 317
See application file for complete search history.

(56) References Cited

U.S. PATENT DOCUMENTS

| | | | |
|---|---|---|---|
| 2,105,864 A | 1/1938 | Saunders | |
| 3,104,554 A | 9/1963 | Mueller et al. | |
| 3,216,264 A | 11/1965 | Lloyd | |
| 3,462,120 A * | 8/1969 | Priese | F16K 5/0673 251/315.14 |
| 4,522,369 A | 6/1985 | Gemignani | |

(Continued)

FOREIGN PATENT DOCUMENTS

| | | |
|---|---|---|
| DE | 2821329 A1 | 11/1979 |
| DE | 8524413 U1 | 10/1985 |
| WO | 2008145891 A1 | 12/2008 |

OTHER PUBLICATIONS

Extended EP Search Report for EP Application No. 16275109.3 dated Feb. 23, 2017; 8 Pages.

(Continued)

*Primary Examiner* — Kevin Murphy
*Assistant Examiner* — Kelsey Cary
(74) *Attorney, Agent, or Firm* — Fletcher Yoder, P.C.

(57) ABSTRACT

A system includes a ball valve. The ball valve includes a housing, a ball, and a first valve seat assembly. The housing includes a chamber, a first fluid passage intersecting the chamber, and a second fluid passage intersecting the chamber. The ball is disposed in the chamber and is configured to control fluid flow between the first and second fluid passages. The first valve seat assembly is disposed between the ball and the housing. The first valve seat assembly includes a first seat configured to seat against the ball both above and below a pressure threshold, and a second seat configured to seat against the ball only above the pressure threshold, wherein the second seat has a coefficient of friction that is lower than the first seat.

23 Claims, 8 Drawing Sheets

(56) References Cited

U.S. PATENT DOCUMENTS

2006/0180214 A1* 8/2006 Arentsen ............... F16K 15/188
                                                        137/613
2006/0284135 A1   12/2006 Hayashi et al.
2010/0200791 A1    8/2010 Yung et al.
2013/0240771 A1    9/2013 Nemenoff
2015/0337968 A1* 11/2015 Strand ..................... F16K 5/06
                                                        251/315.01

OTHER PUBLICATIONS

PCT International Search Report for PCT Application No. PCT US2017/044949 dated Oct. 18, 2017; 11 Pages.

\* cited by examiner

FLEXIBLE SEAT BALL VALVE

CROSS REFERENCE TO RELATED APPLICATION

This application claims priority to and benefit of EP Patent Application No. EP16275109.3, entitled "FLEXIBLE SEAT BALL VALVE", filed Aug. 2, 2016, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates to valve assemblies, in particular to ball valve assemblies. The valve assembly of the present disclosure finds particular use in the control of fluids produced from subterranean wells, but could be used to control the flow of other fluids.

A ball valve rotates a ball with a bore between a fully open position and a fully closed position to control fluid flow. The fluid pressure in a conduit can impact the performance and wear of ball valves. Unfortunately, at higher pressures, an increased amount of friction between a seat and the ball may result in a large amount of torque to actuate the ball valve. Thus, there is a need for an improved ball valve assembly, capable of operating at high pressures, but without the associated high actuation torque.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Fluids are produced from subterranean wells at high pressures (e.g., up to 10,000 psi or more). Fluids, such as gas and oil, together with fluids introduced into the well during drilling and completion operations, such as water and muds, can be produced from the well at pressures up to 10,000 psi and higher. The high pressures increase the friction between the ball and the seat, increasing the torque to actuate the valve. Accordingly, the control of fluids produced from a well represents a significant task for a valve assembly, particularly at high pressures. By utilizing a flexible seat and a low-friction secondary insert that contacts the ball at high pressures, high operating pressures without correspondingly high actuation torques may be achieved.

Figure 1:
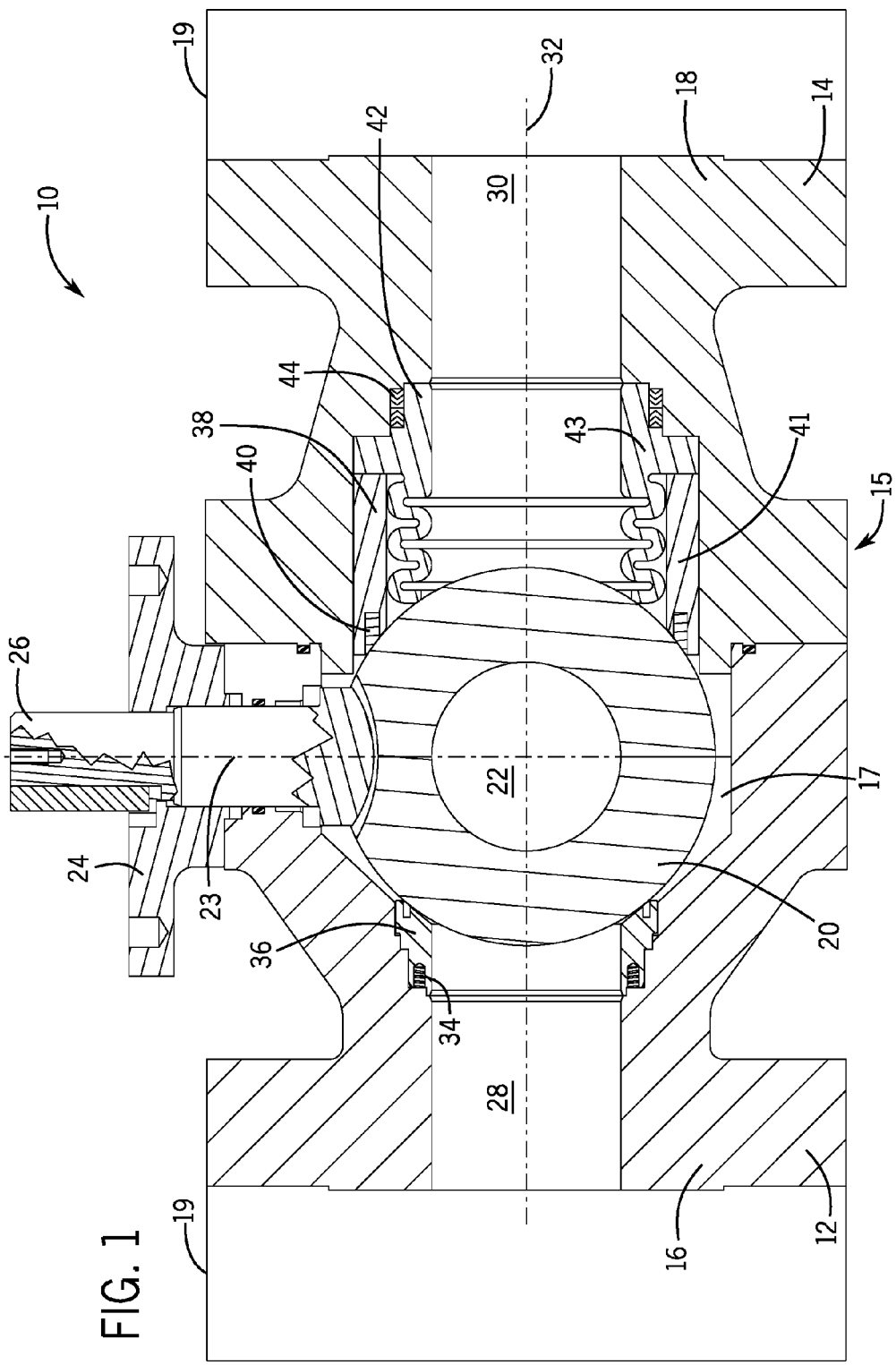
FIG. 1 is a side, section view of one embodiment of a ball valve with a flexible seat and a low-friction insert.

FIG. 1 is a section, side view of one embodiment of a ball valve 10 with a flexible seat and a low-friction secondary contact. For clarity, an X-axis and a Y-axis are shown. The ball valve 10 includes a valve body 12 and a valve closure 14, which couple to one another to form a housing 15 of the valve 10. The housing has a central cavity 17. In the illustrated embodiment, the valve body 12 has a first flange 16 (e.g., annular flange) and the valve closure 14 has a second flange 18 (e.g., annular flange) disposed opposite the first flange 16. The first and second flanges 16, 18 may be coupled to sections of pipe, elbows, or other fluid flow components, or one or more mineral extraction components 19 having a corresponding flange. Fluid flows through the valve 10 in the X-direction. Fluid may flow through the valve 10 from the first flange 16 to the second flange 18, or from the second flange 18 to the first flange 16. Some embodiments of the ball valve 10 may be configured for one-directional fluid flow (e.g., from the first flange 16 to the second flange 18). Other embodiments of the ball valve 10 may be configured for bi-directional fluid flow (e.g., from the first flange 16 to the second flange 18, and from the second flange 18 to the first flange 16). A ball 20 may be disposed within the housing 15. The ball 20 may have a bore 22 through it such that as the ball 20 is rotated about a vertical axis 23, fluid flow through the valve 10 is restricted or enabled. A bonnet 24 may be coupled to the valve body 12 and the valve closure 14 in order to retain the ball 20. A stem 26 extends through the bonnet 24 and interfaces with the ball 20 such that the stem 26 may be rotated to adjust the position of the ball 20, thus enabling or restricting fluid flow through the valve 10.

The valve housing 15, which includes the valve body 12 and the valve closure 14, has a first bore 28 and a second bore 30 (e.g., fluid flow passages), which extend through the housing 15 in the X-direction, intersecting the ball bore 22, and allow fluid to flow through the valve 10. The first and second bores 28, 30 are substantially aligned with one another along a horizontal axis 32. Though the horizontal and vertical axes 32, 23 are used, it should be understood that this is merely for convenience and that any orientation may be possible between first and second crosswise (e.g., perpendicular) axes. The valve body 12 and valve closure 14 may be made of carbon steel, stainless steel, titanium, nickel based alloys, or any other suitable material. The valve body 12 and valve closure 14 may be cast, forged, machined, molded, 3D printed, a combination thereof, or made by some other technique. The valve body 12 and valve closure 14 may or may not be made of the same material and may or may not be made by the same manufacturing process.

Disposed between the body 12 and the ball 20, on a first side (e.g., upstream side) of the ball 20, are one or more annular springs 34, and an annular counterseat 36. The one or more springs 34 push the counterseat 36 against the ball 20 to hold the ball 20 in place, or otherwise create contact between components. In some similar springs 34 may be used on the opposite side of the ball 20 to energize the system. On a second side (e.g., downstream side) of the ball 20 are an annular spacer ring 38 with the annular low-friction insert 40 (e.g., first seat), the annular flexible seat 42 (e.g., second seat), and an annular gasket 44. The annular spacer ring 38, the annular low-friction insert 40, the annular flexible seat 42, and the annular gasket 44 may be collectively referred to as a valve seat assembly. The ball 20 makes contact with the flexible seat 42 and the low-friction insert 40 in stages. Below a threshold pressure, the ball 20 pushes against the flexible seat 42, but the flexible seat 42 does not deflect enough for the ball 20 to make contact with the low-friction insert 40. Accordingly, when the pressure in the valve 10 is below the threshold pressure, the ball 20 is only in contact with the flexible seat 42. Above the threshold pressure, the ball 20 pushes against the flexible seat 42 and deflects the flexible seat 42 such that the ball 20 makes contact with the insert 40, which shares the load of the ball 20 with the flexible seat 42. The insert 40 is made of a material with a lower coefficient of friction than the flexible seat 42, such that as the low-friction insert 40 bears more of the load from the ball, the torque to actuate the valve 10 is reduced. This is shown and described in more detail with regard to FIGS. 3 and 4 below. Though in the illustrated embodiment, the spacer ring 38 contains an insert 40 of a low friction material, in other embodiments, the entire spacer ring 38 may be made of a low friction material. In such an embodiment, the spacer ring 38 may not include an insert, and may contact the ball 20 directly.

The flexible seat 42, spacer ring 38, and insert 40 may be generally annular in shape. The flexible seat 42 may include an annular bellows portion 41 and an annular portion 43 along its length in the X-direction. The bellows portion 41 allows the flexible seat 42 to deflect such that its length in the X-direction may extend or contract. The bellows portion 41 includes a curving wall that alternatingly increases and decreases in diameter to define a wave pattern, which is configured to compress and expand in the X-direction. In other embodiments, the flexible seat may have a compressible portion having one or more turns or curved portions, which are configured to contract or expand in X-direction. The flexible seat 42 may be made of carbon steel, stainless steel, titanium, nickel based alloys, or any other suitable material. The material of the flexible seat may be selected such that the flexible seat expands and/or contracts a given amount relative to the expansion and/or contraction of the spacer ring 38 and insert 40. For example, in operation the expansion and/or contraction may be 1.1, 1.5, 2, 2.5, 3, 3.5, 4, 4.5, 5, 6, 7, 8, 9, or 10 times that of the spacer ring 38 and insert 40. For example, the spacer ring 38 may provide no expansion or contraction, while the insert 40 may provide less than 1, 2, 3, 4, 5, 6, 7, 8, 9, 10, 15, or 20% of the expansion and/or contraction of the flexible seat 42. The spacer ring 38 may or may not be made of the same material as the flexible seat 42. The low-friction insert 40 is made of a low-friction material, such as polyether ether ketone (PEEK), Polytetrafluoroethylene (PTFE), low friction metals, such as brass, coated metals, coated non-metals, plastics and elastomers, etc., such that the frictional forces between the ball 20 and the insert are low when the ball 20 is rotated about the vertical axis 23 to actuate the valve. For example, the low friction insert may have a coefficient of friction $\mu_{insert}$ of 0.01, 0.02, 0.03, 0.04, 0.05, 0.06, 0.07, 0.08, 0.09, 0.1, 0.13, 0.15, 0.17, or any other value less than the coefficient of friction of the flexible seat 42. The coefficient friction of the insert 40 $\mu_{insert}$ may also be defined as a percentage of the coefficient friction of the flexible seat 42 $\mu_s$. For example, $\mu_{insert}$ may be 5%, 10%, 15%, 20%, 25%, 30%, 40%, 50%, 60%, 70%, 80%, or 90% of $\mu_s$. In the illustrated embodiment, the spacer ring 38 is disposed about the flexible seat 42. However, embodiments in which the flexible seat 42 is disposed about the flexible seat 42 are also envisaged.

The spring 34 may be selected such that the spring 34 applies a force in the X-direction to the counterseat 36, which transfers that force to the ball 20. The ball 20 then acts on the flexible seat 42 with sufficient force to create a metal-to-metal seal between the flexible seat 42 and the ball 20.

The bonnet 24 couples to the top of the valve 10 and restricts movement of the ball 20 in the Y-direction. The bonnet 68 may be made of carbon steel, stainless steel, titanium, nickel based alloys, or any other suitable material. The bonnet 68 may be cast, forged, machined, molded, 3D printed, a combination thereof, or made by some other technique. The material and/or method of fabrication of the bonnet 68 may or may not match that of the housing 15.

Figure 2:
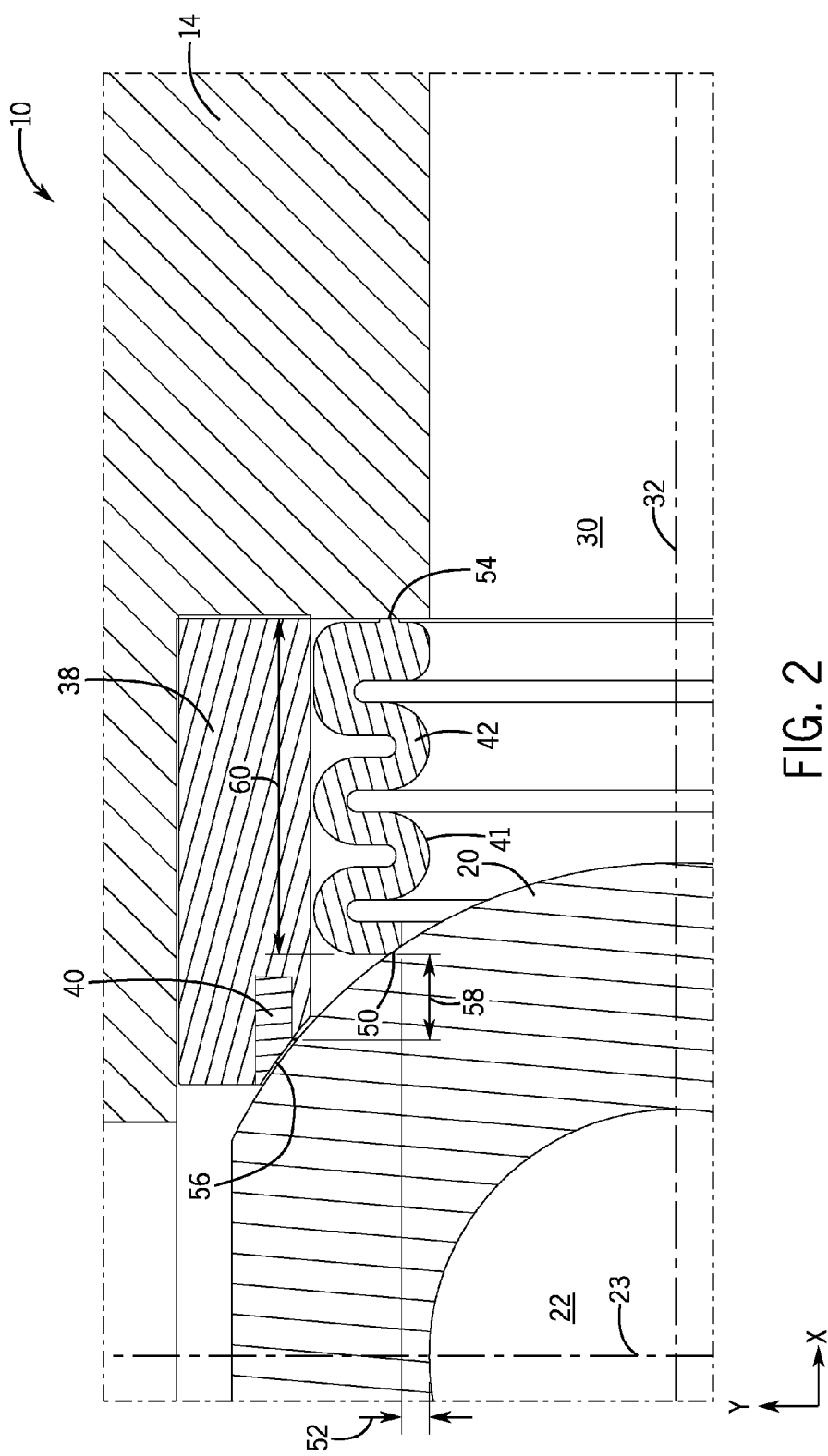
FIG. 2 is a side, section, detail view of one embodiment of an interface between the ball, the flexible seat, and the low-friction insert at a high operating pressure.

FIG. 2 is a side, section, detail view of an embodiment of an interface between the ball 20, the flexible seat 42, and the low-friction insert 40 at a high operating pressure. As illustrated, the flexible seat 42 contacts the ball 20 at an annular contact area 50 creating a metal-to-metal seal with the ball 20. The annular contact area 50 is a radial distance 52 outside of the ball bore 22, such that when the ball bore 22 is aligned with the first and second bores 28, 30, and fluid flows through the valve 10, fluid does not escape the flow path. The end of the flexible seat 42 opposite the ball 20 contacts the valve closure 14 at an annular contact area 54 which may or may not be radially aligned with the annular contact area 50 at which the flexible seat 42 contacts the ball 20. Because the flexible seat 42 is flexible and spring-like in structure, a metal-to-metal seal is also created between the flexible seat 42 and the valve closure 14 at the annular contact area 54 at which they meet. As with the metal-tometal seal with the ball 20, the metal to metal seal between the flexible seat 42 and the valve closure 14 blocks fluid from escaping the flow path through the valve 10.

The spacer ring 38 is disposed circumferentially about the flexible seat 42 and includes low friction insert 40. As shown, the spacer ring 38 and low friction insert 40 may have a chamfered annular surface that contacts the ball 20. At pressures above a threshold pressure, the ball 20 pushes on the flexible seat 42 in the X-direction, causing the flexible seat 42 to deflect, enabling the ball to move in the X-direction toward the flexible seat 42, and making contact with the low-friction insert 40 at an annular contact area 56. As the pressure changes within the valve the annular contact area 50 between the ball 20 and the flexible seat 42 may move relative to the annular contact area 54 between the valve closure 14 and the flexible seat 42, and/or the annular contact area 56 between the ball 20 and the insert 40. For example, as the pressure of the fluid in the valve increases, the distance 58 between the annular contact area 50 between the ball 20 and the flexible seat 42 and the annular contact area 54 between the valve closure 14 and the flexible seat 42 may increase, while the distance 60 between the annular contact area 50 between the ball 20 and the flexible seat 42 and the annular contact area 54 between the valve closure 14 and the flexible seat 42 may decrease. In some embodiments, the ball 20 may only contact the low friction insert 40, but not the spacer ring 38. In other embodiments, the ball 20 may contact the low friction insert 40 and the spacer ring 38. Because the spacer ring 38 and insert 40 are rigid relative to the flexible seat 42, and the flexible seat 42 is flexible, as the operating pressure increases, the spacer ring 38 and insert 40 bear a larger and larger percentage of the load from the ball 20. In operation, the flexible seat 42 has a range of expansion and contraction in the X-direction, whereas the spacer ring 38 may lack any ability to expand and contract, while the insert 40 may provide minimal expansion. The insert 40 may be made of a material having a comparatively low coefficient of friction when compared to the flexible seat 42 (e.g., the flexible seat may have a coefficient of friction $\mu_s$ of 0.2, while the insert 40 may have a coefficient of friction $\mu_{insert}$ of 0.05), such that frictional forces between the flexible seat 42, the insert 40, the spacer ring 38, and the ball 20 remain low as the ball rotates about the vertical axis 23 during actuation. Low frictional forces result in low torque values to actuate the valve 10.

Figure 3:
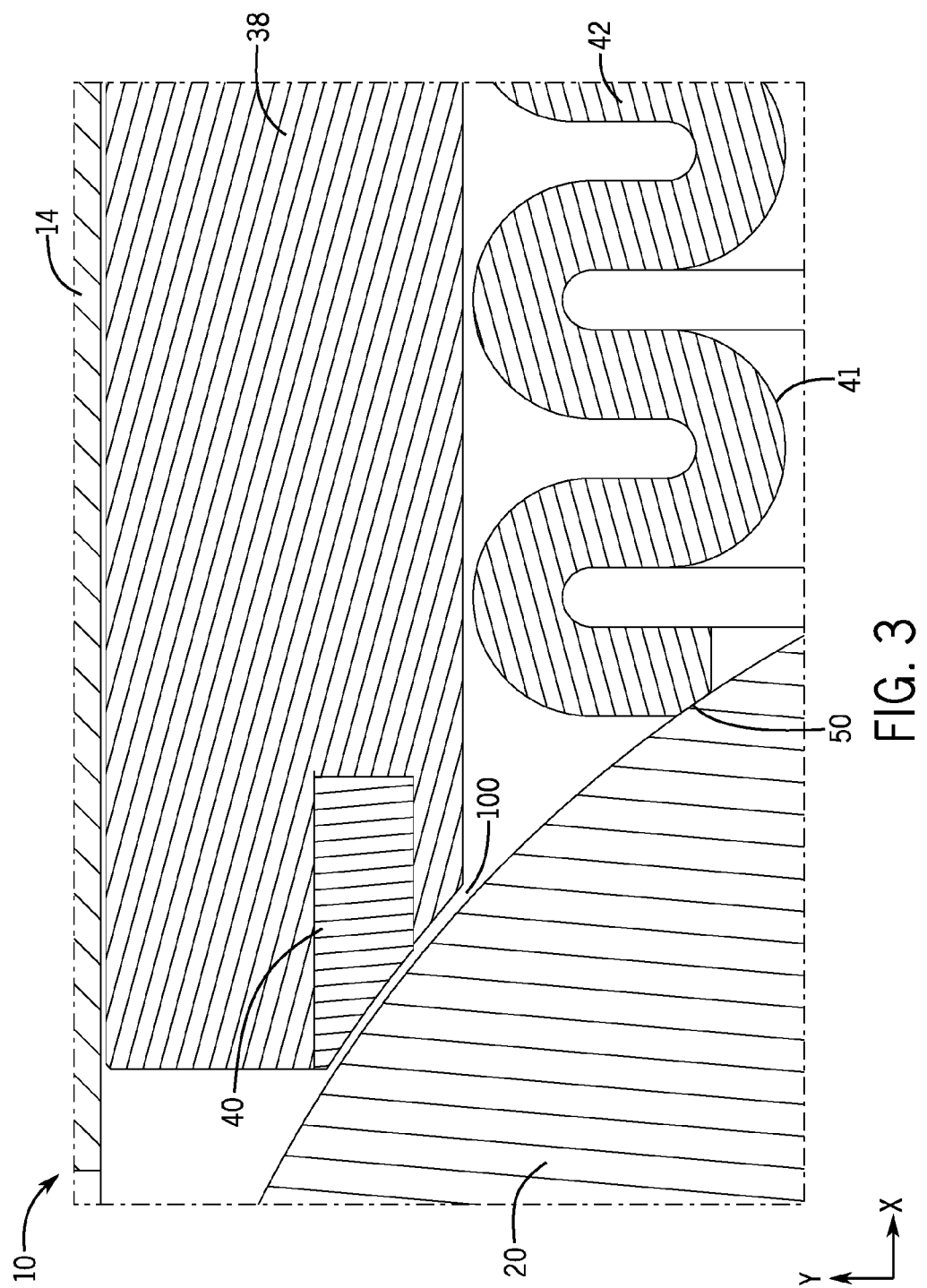
FIG. 3 is a side, section, detail view of one embodiment of the interface between the ball, the flexible seat, and the low-friction insert at a sub-threshold operating pressure.

FIG. 3 is a side, section, detail view of one embodiment of the interface between the ball 20, the flexible seat 42, and the low-friction insert 40 at a sub-threshold operating pressure. When the operating pressure of the valve 10 is below a threshold pressure, the flexible seat 42 contacts the ball 20 (e.g., at annular contact area 50), but the low-friction insert 40 and/or spacer ring 38 do not contact the ball 20. Instead, a small annular gap 100 exists between the ball 20 and the insert 40 and/or spacer ring 38. As the operating pressure of the fluid in the valve 10 increases, so too does the force of the ball 20 acting on the flexible seat 42, causing the flexible seat 42 to deflect (e.g., contract or compress in the X-direction). As the flexible seat 42 deflects, the ball 20 moves in the X-direction, maintaining contact with the flexible seat 42, and decreasing the size of the gap 100. As the operating pressure of the valve 10 reaches the threshold pressure, the gap 100 closes and the ball 20 makes contact with the low friction insert 40.

Figure 4:
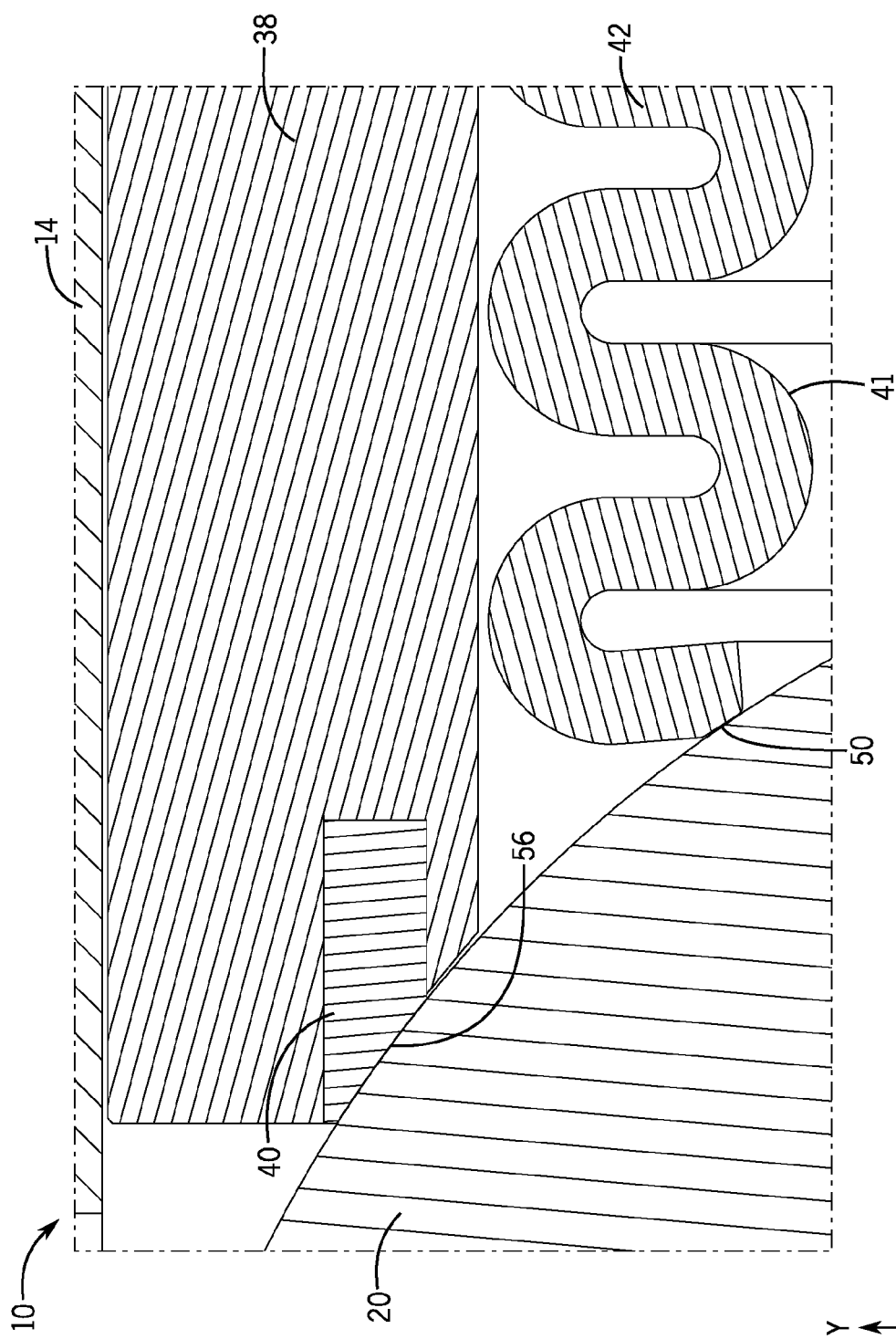
FIG. 4 is a side, section, detail view of one embodiment of the interface between the ball, the flexible seat, and the low-friction insert at an operating pressure above the threshold pressure.

FIG. 4 is a side, section, detail view of one embodiment of the interface between the ball 20, the flexible seat 42, and the low-friction insert 40 at an operating pressure above the threshold pressure. When the ball 20 makes contact with the insert 40, the insert 40 and the spacer ring 38 bear at least some of the load of the ball 20 being pushed in the X-direction. Because the spacer ring 38 and insert 40 are generally stationary and rigid relative to the flexible seat 42, once the ball 20 makes contact with the insert 40, the ball's movement in the X-direction ceases or substantially ceases as the operating pressure increases. Accordingly, once the ball 20 makes contact with the flexible seat 42, the flexible seat 42 stops deflecting (e.g., contracting in the X-direction) and reaches a steady state in which the load on the flexible seat 42 remains substantially constant. As the load of the ball 20 on the flexible seat 42 and insert 40 increases due to the operating pressure being above the threshold pressure, the flexible seat 42 bears a substantially constant load while the insert 40 and spacer ring 38 bear the rest of the load.

The low-friction insert 40 is made of a low-friction material such that the frictional forces between the ball 20 and the insert are lower than those between the flexible seat 42 and the ball 20 when the ball 20 is rotated about the vertical axis 23 to actuate the valve 10. Thus, the insert 40 allows high operating pressures without corresponding high torque values to actuate the valve 10.

For example, for a typical (e.g., rigid seat) ball valve, assume an operating pressure ($P_d$) of 690 bar, an operating temperature ($T_{max}$) of 121 Celsius, that the first and second bores 28, 30 have a diameter (ID) of 135 millimeters, the ball 20 has a diameter ($D_b$) of 235 millimeters, and a (rigid) seat outer diameter ($OD_{seat}$) of 224 millimeters, and a coefficient of friction between the ball 20 and the rigid seat ($\mu_s$) of 0.2. The contact diameter ($D_c$) may be expressed by:

$$D_c = \frac{ID + OD_{seat}}{2} = 179.5 \text{ mm.} \tag{1}$$

The thrust of the ball on the seat ($T_b$) may be determined by:

$$T_b = \frac{\pi D_c^2 P_d}{4} = 1{,}750{,}000 \text{ N.} \tag{2}$$

The axial distance between the contact circle and the vertical axis 23 (A) may be determined by:

$$A = \sqrt{\left(\frac{D_b}{2}\right)^2 - \left(\frac{D_c}{2}\right)^2} = 75.8 \text{ mm.} \tag{3}$$

Thus, by inputting these values into a model, the torque to actuate the valve 10, or the "break to open" (BTO) torque for a typical (rigid seat) ball valve is approximately 42,900 Nm.

In contrast, for a flexible seat 42 ball valve according to certain embodiments disclosed herein, assume similar conditions as those discussed above, as well as an insert coefficient of friction ($\mu_{insert}$) of 0.05, a seat contact diameter ($D_{c,seat}$) of 153.57 millimeters, a thrust of the ball on the seat ($T_{b,seat}$) determined using finite element (FEA) analysis of 426,700 Newtons, an insert contact diameter ($D_{c,insert}$) of 177.83 millimeters, and a thrust of the ball on the seat ($T_{b,insert}$) determined using finite element (FEA) analysis of 1,094,000 Newtons. Using equation 3 above, the axial distance between the contact circle of the seat and the vertical axis 23 ($A_{seat}$) is 88.94 millimeters. Using a model, the break to open torque for the seat 42 ($BTO_{seat}$) is determined to be 9973 Newton meters. The axial distance between the annular contact area of the insert 40 and the vertical axis 23 ($A_{insert}$) may be determined by:

$$A_{insert} = \sqrt{\left(\frac{D_b}{2}\right)^2 - \left(\frac{D_{c,insert}}{2}\right)^2} = 76.81 \text{ mm.} \quad (4)$$

Thus, inputting these values into a model, the break to open (BTO) torque for the insert 40 is determined to be approximately 7,767 Nm.

The BTO torque for the entire valve ($BTO_{total}$) may be determined by:

$$BTO_{total} = BTO_{seat} + BTO_{insert} = 17,740 \text{ Nm.} \quad (5)$$

Thus, in this particular example, use of the flexible seat 42 and the low-friction insert 40 reduces the BTO torque of the valve 10 by more than 50%. Though FIG. 1 only shows the seat assembly (e.g., the spacer ring 38, insert 40, and flexible seat 42) on one side of the ball 20, it should be understood that a similar seat assembly (e.g., having a second spacer ring 38, a second insert 40, and a second flexible seat 42) maybe disposed on the opposite side of the ball 20 in place of the spring 34 and counterseat 36. The second seal assembly may seal in a similar matter to the first seal assembly relative to a second threshold pressure, which may be the same or different as the first threshold pressure.

Figure 5:
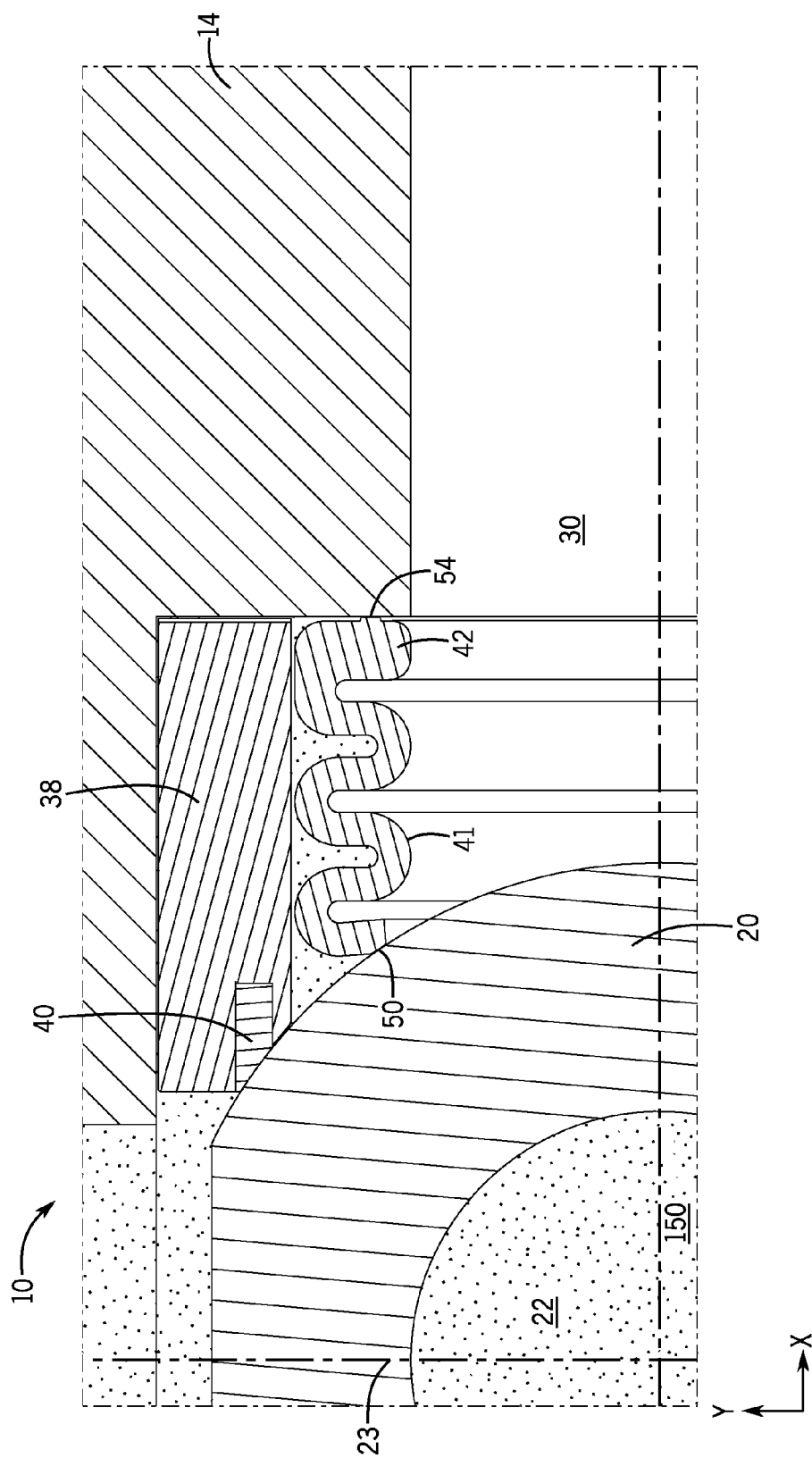
FIG. 5 illustrates one embodiment of the ball valve in a downstream sealing condition.
Figure 6:
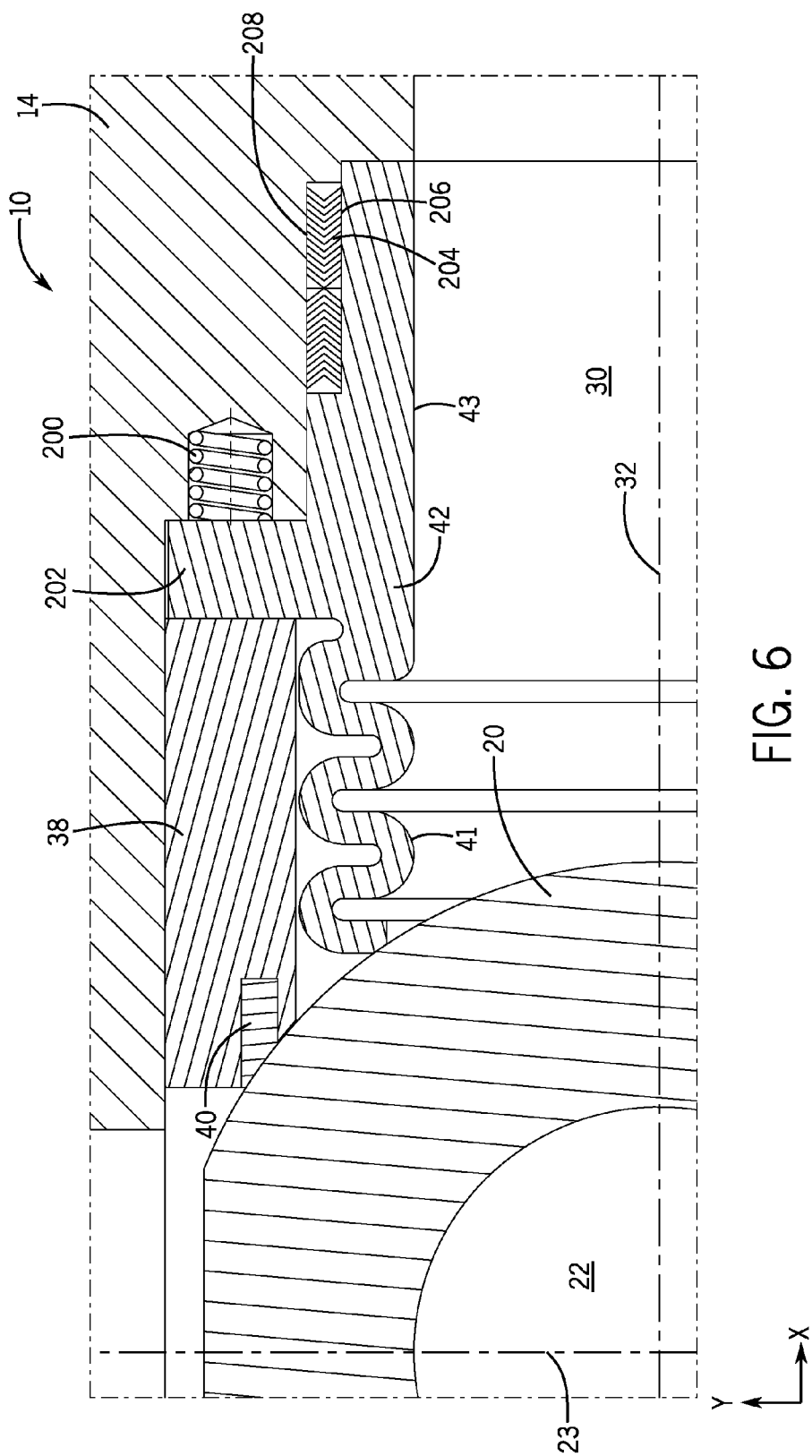
FIG. 6 is a side, section, detail view of one embodiment of the valve in a "double effect" configuration.
Figure 7:
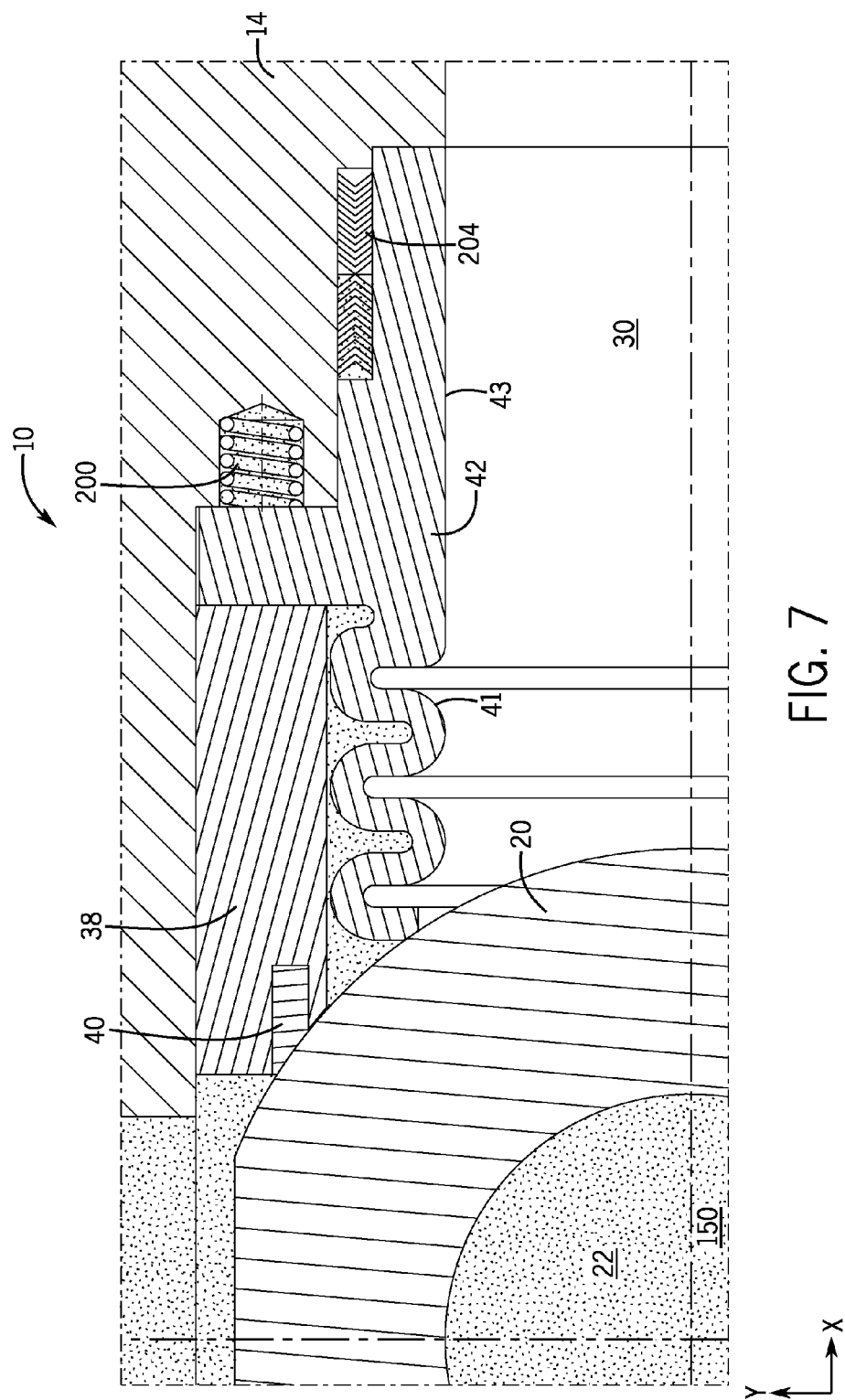
FIG. 7 is a side, section, detail view of one embodiment of the "double effect" configuration shown in FIG. 6 in a downstream sealing condition.
Figure 8:
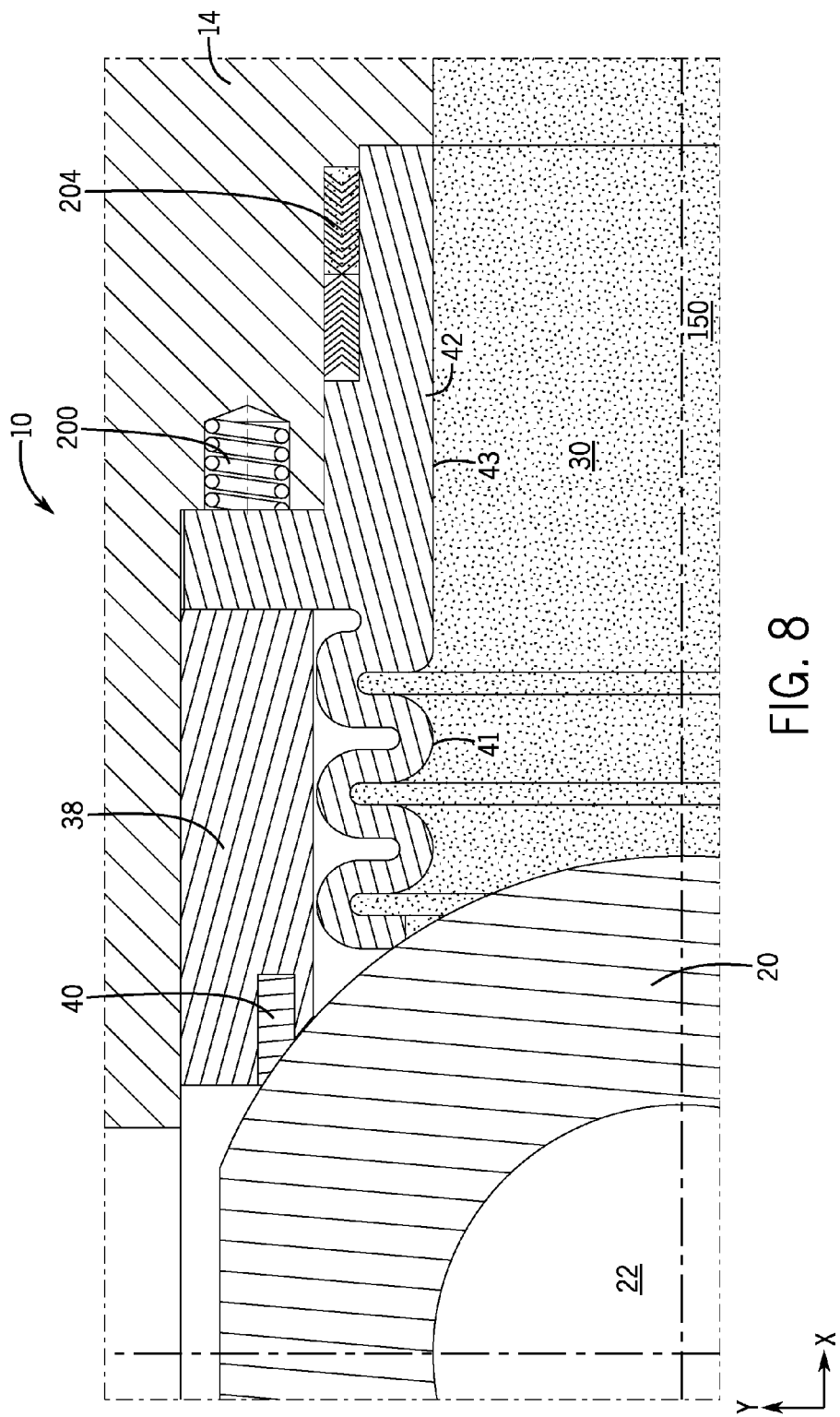
FIG. 8 is a side, section, detail view of one embodiment of the valve shown in FIGS. 6 and 7 in an upstream sealing condition.

FIG. 5 illustrates one embodiment of the ball valve 10 in a downstream sealing condition (e.g., sealing as fluid 150 flows from the first flange 16 to the second flange 18). As illustrated, the ball bore 22 is oriented transverse to the second bore 30 (and also the first bore 28), blocking fluid flow through the valve 10. Fluid 150 fills the first bore 28 and the ball bore 22. The pressure of the fluid 150 in the first bore 28 pushes the ball 20 in the X-direction toward the flexible seat 42, the spacer ring 38, and the insert 40. As previously discussed, the spacer ring 38 and low friction insert 40 may bear some of the load from the ball 20 in order to reduce actuation torque. A metal-to-metal seal is formed with the ball 20 at one end of the flexible seat 42, and with the valve closure 14 at the opposite end of the flexible seat 42, blocking fluid 150 from entering the second bore 30. Because the illustrated embodiment (e.g., a "floating" ball valve, wherein the ball 20 acts on the seat 42) relies on the spring 34 (see FIG. 1) and the pressure of the fluid 150 in the first bore 28 to push the ball 20 in the X-direction and create seals at either end of the flexible seat 42, the illustrated configuration may be able to create a downstream sealing condition (e.g., fluid in the first bore 28 when sealed, but not the second bore 30), but not an upstream sealing condition. FIGS. 6-8 illustrate an embodiment of the ball valve 10 (e.g., a "trunnion" ball valve, wherein the seat 42 acts on the ball 20) with a flexible seat 42, and low friction insert 40 that is capable of both upstream and downstream sealing conditions.

FIG. 6 is a side, section, detail view of one embodiment of the valve 10. The illustrated embodiment is a "double effect" ball valve 10, because the valve 10 utilizes characteristics of both floating ball valves and trunnion style valves. Whereas in a floating ball style ball valve, the pressure of the fluid presses the ball 20 against the seat 42, forming a seal, in a trunnion style ball valve, the ball 20 remains stationary and the seat 42 presses the seat 42 against the ball to form a seal. It should be understood, however, that a ball valve 10 may be a "double effect" ball valve in that the valve acts like a floating ball style valve when fluid flows through the valve in one direction, and like a trunnion style ball valve when fluid flows through the valve in the opposite direction. As shown in FIG. 6, one or more annular springs 200 are disposed within the valve closure 14. In the illustrated embodiment, the flexible seat 42 may include one or more protrusions 202 (e.g., annular protrusion or flange) extending radially outward. The one or more protrusions 202 may be annular in shape, extending circumferentially about the horizontal axis 32, or may be one or more tabs. The protrusion 202 extends between the spacer ring 38 and the spring 200, such that the spring 200 pushes (e.g., biases) the flexible seat 42 and the spacer ring 38 toward the ball 20, creating a metal-to-metal seal between the flexible seat 42 and the ball 20. The valve 10 also includes an annular gasket 204 disposed about the flexible seat 42, at the end opposite the ball 20, which forms a seal between the an exterior surface 206 of the flexible seat 42, and an interior surface 208 of the valve closure 14. The spring 200 provides sufficient force to create a seal between the ball 20 and the flexible seat 42, but not enough that the insert 40 contacts the ball 20. As previously discussed, the insert 40 does not make contact with the ball 20 until a threshold operating pressure is met.

FIG. 7 is a side, section, detail view of one embodiment of the "double effect" ball valve 10 shown in FIG. 6 in a downstream sealing condition. As with the downstream sealing condition shown and described with regard to FIG. 5 above, a metal-to-metal seal between the flexible seat 42 and the ball 20 blocks fluid 150 from entering the second bore 30. Rather than a second metal-to-metal seal between the flexible seat 42 and the valve closure 14, the gasket 204 forms a seal between the flexible seat 42 and the valve closure 14, blocking fluid from entering the second bore 30.

One advantage of the embodiment of the valve 10 illustrated in FIGS. 6-8, is its ability to maintain both a downstream sealing condition (e.g., sealing as fluid 150 flows from the first flange 16 to the second flange 18) and an upstream sealing condition (e.g., sealing as fluid 150 flows from the second flange 18 to the first flange 16). FIG. 8 is a side, section, detail view of one embodiment of the valve shown in FIGS. 6 and 7 in an upstream sealing condition. As with the downstream sealing condition shown in FIG. 7, the seal between the flexible seat 42 and the ball 20, and the seal created by the gasket 204 blocks fluid flow across the seals. In the downstream sealing condition of FIG. 7, the seals block fluid flow into the second bore 30. In the upstream sealing condition shown in FIG. 8, the seals block fluid flow out of the second bore 30 (e.g., into the ball bore 22 and the first bore 28).

By using a flexible seat and low friction component to bear some of the load, a ball valve may be operated at high pressures without the corresponding high BTO torque to actuate the valve. The techniques may be used in both floating ball valve (in which the ball acts on the seat) and trunnion ball valve (in which the seat acts on the ball) configurations. The disclosed techniques may also be used in a hybrid type "double floating" ball valve in which the ball acts like a floating ball valve (i.e., the ball acts on the seat to create a seal) in a downstream sealing condition, and like a trunnion ball valve (i.e., the seat acts on the ball to create a seal) in an upstream sealing condition.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising:
   a ball valve, comprising:
   a housing having a chamber, a first fluid passage intersecting the chamber, and a second fluid passage intersecting the chamber;
   a ball disposed in the chamber, wherein the ball is configured to move to control fluid flow between the first and second fluid passages;
   a first valve seat assembly disposed between the ball and the housing, wherein the first valve seat assembly comprises:
   a first seat configured to seat against the ball both above and below a pressure threshold, wherein the first seat comprises a bellows portion configured to expand and contract; and
   a second seat configured to seat against the ball only above the pressure threshold, wherein the second seat has a coefficient of friction that is lower than the first seat, wherein the first valve seat assembly comprises at least one of:
   the bellows portion is biased by one or more springs; or
   the second seat comprises a seat insert disposed in a seat ring, wherein the seat ring is configured to contact a wall in the housing formed by a recess, and the first seat is configured to contact the wall in the housing formed by the recess.

2. The system of claim 1, wherein the first seat comprises a first metal.

3. The system of claim 2, wherein the second seat comprises a second metal having the coefficient of friction that is lower than the first metal.

4. The system of claim 2, wherein the second seat comprises a plastic.

5. The system of claim 4, wherein the plastic comprises a Polyether ether ketone (PEEK), a Polytetrafluoroethylene (PTFE), or a combination thereof.

6. The system of claim 1, wherein the first seat comprises one or more curved portions configured to expand and contract.

7. The system of claim 1, wherein the first and second seats are coaxial with an axis of the first fluid passage.

8. The system of claim 1, wherein the bellows portion is biased by the one or more springs.

9. The system of claim 8, wherein the first seat comprises a protrusion extending away from the bellows portion, and the protrusion is biased by the one or more springs to bias the first and second seats against the ball.

10. The system of claim 1, wherein the second seat comprises the seat insert disposed in the seat ring, and the seat ring contacts the wall in the housing formed by the recess, and the first seat contacts the wall in the housing formed by the recess.

11. The system of claim 1, comprising a second valve seat assembly disposed between the ball and the housing, wherein the second valve seat assembly comprises:
    a third seat configured to seat against the ball both above and below a second pressure threshold; and
    a fourth seat configured to seat against the ball only above the second pressure threshold, wherein the fourth seat has a coefficient of friction that is lower than the third seat.

12. The system of claim 1, wherein the first seat is disposed about an axis, and the second seat is disposed about the axis and the first seat.

13. The system of claim 1, comprising a component of a subterranean well coupled to the ball valve.

14. A system, comprising:
    a first valve seat assembly configured to mount between a ball and a housing of a ball valve, wherein the first valve seat assembly comprises:
    a first seat configured to seat against the ball both above and below a pressure threshold, wherein the first seat comprises a bellows portion configured to expand and contract; and
    a second seat configured to seat against the ball only above the pressure threshold, wherein the second seat has a coefficient of friction that is lower than the first seat, wherein the first valve seat assembly comprises at least one of:
    the bellows portion is biased by one or more springs; or
    the second seat comprises a seat insert disposed in a seat ring, wherein the seat ring is configured to contact a wall in the housing formed by a recess, and the first seat is configured to contact the wall in the housing formed by the recess.

15. The system of claim 14, wherein the first seat comprises a first metal, and the second seat comprises a second metal having the coefficient of friction that is lower than the first metal.

16. The system of claim 14, wherein the first seat comprises a first metal, and the second seat comprises a plastic.

17. The system of claim 14, wherein the first seat comprises one or more curved portions configured to expand and contract.

18. The system of claim 14, wherein the second seat comprises the seat insert disposed in the seat ring, wherein the seat ring is configured to contact the wall in the housing formed by the recess, and the first seat is configured to contact the wall in the housing formed by the recess.

19. The system of claim 14, wherein the bellows portion is biased by the one or more springs.

20. The system of claim 14, comprising the ball valve having the first valve seat assembly.

21. A method, comprising:
    seating a first seat against a ball of a ball valve both above and below a pressure threshold of a fluid pressure, wherein the first seat comprises a bellows portion configured to expand and contract; and
    seating a second seat against the ball only above the pressure threshold when the bellows portion moves a distance relative to the second seat to close a gap between the second seat and the ball in response to the fluid pressure, wherein the second seat has a coefficient of friction that is lower than the first seat, wherein the method comprises at least one of:
    biasing the bellows portion with one or more springs; or
    contacting the first seat against a wall in a housing formed by a recess and contacting a seat ring of the second seat against the wall in the housing formed by the recess, wherein a seat insert is disposed in the seat ring.

22. The method of claim 21, comprising the biasing of the bellows portion with the one or more springs.

23. The method of claim 21, comprising the contacting of the first seat against the wall in the housing formed by the recess and the contacting of the seat ring of the second seat against the wall in the housing formed by the recess, wherein the seat insert is disposed in the seat ring.

\* \* \* \* \*